Sept. 4, 1934.  M. E. WALSH  1,972,697

FISH LURE

Filed Oct. 2, 1931

INVENTOR.
M. E. WALSH
BY M. Talbert Dick
ATTORNEY.

UNITED STATES PATENT OFFICE 1,972,697

FISH LURE

Michael E. Walsh, Chicago, Ill.

Application October 2, 1931, Serial No. 566,454

3 Claims. (Cl. 43—47)

The principal object of my invention is to provide a fish lure that attracts fish by producing the illusion of a wiggling living bait when drawn through the water.

A further object of this invention is to provide a novel fish lure that does not twist and tangle the fish line to which it is secured.

A still further object of my invention is to provide a fish lure that successfully holds the fish after the same has been hooked, thereby reducing the number of lost fish after the fish has been hooked as well as the hook assembly which is often lost with the fish.

A still further object of this invention is to provide a fish lure that is not easily damaged by the fish caught on the hook.

A still further object of my invention is to provide a fish lure of substantial dimensions but of light weight.

A still further object of this invention is to provide a lure for fishing that is economical in manufacture and durable in use.

My invention consists in the construction, arrangement and combination of the various parts of the device, whereby the objects contemplated are attained as hereinafter more fully set forth, pointed out in my claims and illustrated in the accompanying drawing, in which:

Fig. 3 is a side sectional view of a portion of the invention showing a solidly constructed lure in the form of a small fish or like.

There are many fish lures now being successfully used, but their chief objections are their subjections to damage from the fish hooked and the possibility of the lure portions themselves being used by the hooked fish to pry itself from the hook. Furthermore, few fish lures produce a life-like appearance when being drawn on or through the water. I have overcome such objections by providing an attractive fish lure that is capable of not only moving away from the fish when hooked, but one that is especially life-like in its movements when in use.

Figure 1:
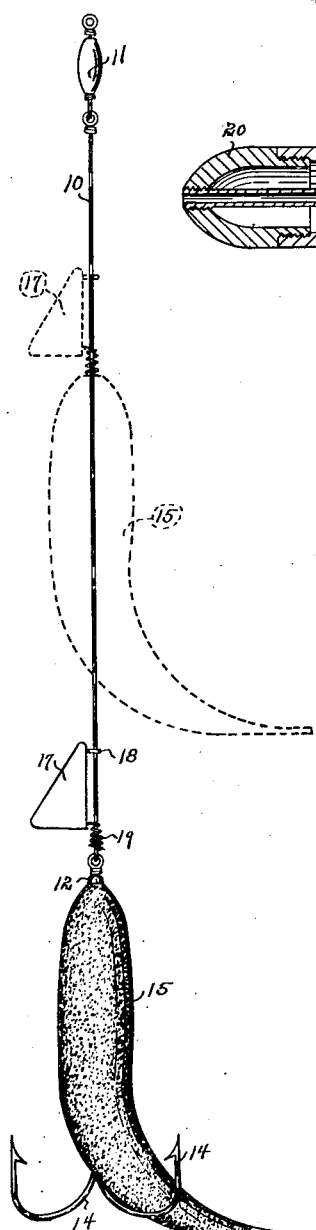
Fig. 1 is a plan view of my complete invention ready for use, with dotted lines showing the position the main portion of the lure moves to after a fish is hooked.

I have used the numeral 10 to designate a metallic lead wire having the swivel 11 secured to its forward end. It is to this swivel 11 that the main fish line is designed to be secured. The numeral 12 designates a second swivel rigidly secured at one end to the rear end of the leader 10, as shown in Fig. 1. Secured to the other end of the swivel 12 by a section of metallic wire 13 is a fish hook or fish hook assembly 14. In the drawing I show an assembly of three fish hooks.

Figure 3:
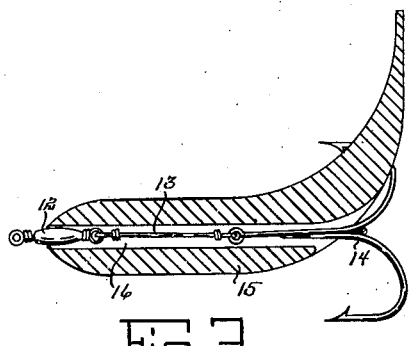
Figure 4:
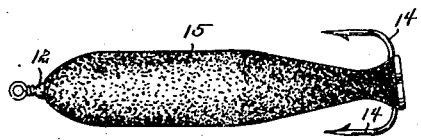
Fig. 4 is a top plan view of the lure and hook assembly and more fully illustrates the tail construction of the lure.
Figure 5:
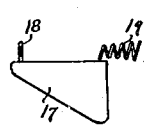
Fig. 5 is a side view of the sinker portion of the device.

I have used the numeral 15 to generally designate the lure portion of the device. Although this lure portion 15 may be of any suitable style or design, I especially recommend that it be in the form of a small fish, as shown in Fig. 1. By providing a bore 16 completely through and longitudinal of the lure 15, the lure is capable of sliding forwardly and rearwardly on the leader 10, swivel 12, wire strand 13 or the forward end of the hook assembly 14 when the lure embraces those members, as shown in Fig. 3. Naturally the lure 15 will normally assume a position around the elements shown in Fig. 3 by gravity or its resistance to the water when the device is being moved through the water. When in this position of its extreme rear sliding movement relative to the leader 10, two of the fish hooks of the hook assembly will curve to each side of the tail portion of the lure, as shown in Fig. 4 and the third hook will extend downwardly and below the lure, as shown in Fig. 1. These hooks, by engagement with the rear end portion of the lure prevent its further sliding movement to the rear. It is recommended that when this type of lure is used, the strand 13 be of such length as to permit the swivel 12 to slightly protrude from the forward end of the bore 16, as shown in Fig. 3, when the lure 15 is at its extreme rear sliding movement.

When the lure is in the form of a small fish or minnow its tail portion should bend laterally and rather sharply from a point near the dorsal fin to the end of the tail. By canting the extreme end of the tail at an angle to the longitudinal axis of the lure, as shown in Fig. 4, the lure will be given a definite direction of rotation during the casting and trolling procedure. This wiggling and continuous rotating of the lure, caused by the tail portion when drawn through the water produces the surprising optical illusion of a minnow frantically swimming in a given direction near the surface of the water. This life-like effect produced by the construction above described is one of the important features of this invention and is perhaps the secret of its greatest success in actual use. By the fish hooks of the hook assembly extending to each side of the tail portion of the lure, the same will rotate with the fish lure and this spinning of the hooks is very important as any fish striking at the lure is sure to be engaged by at least one of the hooks. This rotation of both lure and hook assembly is made possible without affecting other parts of the device by the swivel 12 having its forward end protruding from the bore 16, as heretofore described.

To prevent any tendency of the rotation of the lure 15 and hook assembly to rotate and tangle the fish line, I have provided the sinker weight 17, as shown in Fig. 1. This weight 17 has an eye 18 at its forward end embracing the leader 10. Secured to the rear end of the sinker 17 and coiled around the leader 10, as shown in Fig. 1, is a coil spring 19 increasing in its coil diameter as it extends toward the lure 15. As all of the weight of the member 17 will be below the leader 10, the same will tend to hold the leader 10 from rotating with the fish lure and hook assembly, thereby keeping the fish line from tangling.

To further aid in this action, the coil 19 will engage the forward end portion of the swivel 12 when the device is being cast or trolled and will successfully hold the forward end portion to which the leader 10 is secured from rotating. The swivel 11 also insures against the tangling of the fish line. A further purpose of the sinker weight 17 and coil 19 is to guard and protect the swivel 12 and lure 15 from weeds or like fouling. To this end it will be noted that the weight 17 tapers to its forward end which is also true of the coil 19.

As we have seen when the device is being cast or moved through the water, the lure 15 and member 17 will be at their rear trailing positions, but as soon as the fish is hooked, the throwing of his head to dislodge the hook, will throw and cause the lure proper and member 17 to move forwardly on the wire 10, as shown by dotted lines in Fig. 1. This natural throwing of the lure by the fish away from him will not only place the lure beyond damage from the hooked fish, but will eliminate the use of the lure by the fish as a purchase or leverage to tear the hook from his mouth. Furthermore, the manual sliding of the lure forwardly on the wire 10 permits complete access to the hook assembly for the removal of the same from the mouth of the fish caught.

Figure 2:
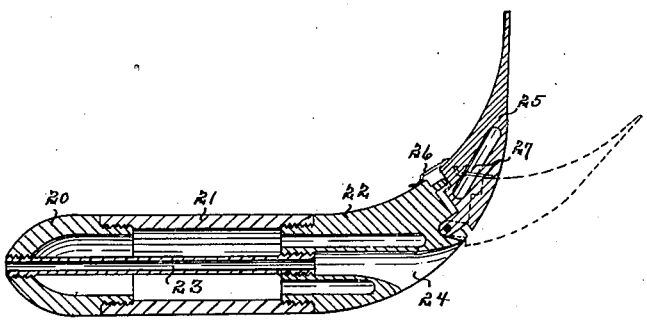
Fig. 2 is a side sectional view of the lure portion of the invention illustrating a hollow material construction with a movable tail portion.

The lure 15 may be successfully made of wood, composition, metal or the like. If the lure is made of light metal, I recommend a construction similar to that shown in Fig. 2. In Fig. 2 I have designated the head portion of the lure by the numeral 20. This head portion 20 is little more than a shell and threaded onto its rear portion is a tube or body portion 21. The numeral 22 designates the rear body portion of the lure which is threaded into the rear end of the portion 21.

The numeral 23 designates a tube having its forward end threaded through the forward end of the head portion 20 and its rear end threaded into the bore 24 of the portion 22. The threads of these parts should be tight and so sealed that no water can enter the hollow portions in the members 20, 21 and 22. The tube 23 and bore 24 find their equivalent in the bore 16 of the lure shown in Fig. 3. The numeral 25 designates the extreme tail portion of the lure hinged near its bottom forward end to the portion 22, as shown in Fig. 2. A small catch or like 26 secured to the tail 25 yieldingly engages the member 22 for yieldingly holding the tail 25 in a normal position. By this construction when a fish strikes the lure, the tail 25 may move to positions more parallel with the longitudinal axis of the lure, thereby eliminating any possibility of the fish caught breaking the tail portion of the lure. Also this possible movement of the tail 25 permits the fish to more successfully embrace the hook assembly with its mouth resulting in sure catches. The numeral 27 designates a sealed air space in the tail portion 25. When a lure is fabricated like or similar to that shown in Fig. 2, the same is very buoyant and successfully functions at all times on or near the surface of the water.

The complete device may be of any suitable color or colors.

I claim:

1. In a fish lure, a body member having a horizontal pivot, a tail formation swingably mounted vertically and about the horizontal pivot; the body member and tail formation having cooperating stops to limit relative movement in an upward direction, and a spring secured to the tail formation and slidably engaging the body member adapted to hold the tail formation to normal position.

2. In a fish lure, a body member having a horizontal pivot, a tail formation swingably mounted vertically and about the horizontal pivot; the body member and tail formation having cooperating stops to limit relative movement in an upward direction, and a means for yieldingly holding said tail formation in a normal position.

3. In a fish lure, a body member having a horizontal pivot, a tail formation swingably mounted vertically and about the horizontal pivot, and a spring member secured to the tail formation and slidably engaging the body member for yieldingly holding the tail formation to a normal position.

MICHAEL E. WALSH.